(12) United States Patent
Ohara et al.

(10) Patent No.: US 7,780,176 B2
(45) Date of Patent: Aug. 24, 2010

(54) CENTER TAKE-OFF RACK-AND-PINION STEERING APPARATUS

(75) Inventors: Yoshihide Ohara, Kahiba (JP); Masahiko Hirose, Osaka (JP); Masaaki Hashimoto, Kahiwara (JP); Mutsumi Watanabe, Kashihara (JP); Takahiro Tanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 380 days.

(21) Appl. No.: 12/073,970

(22) Filed: Mar. 12, 2008

(65) Prior Publication Data
US 2008/0224434 A1  Sep. 18, 2008

(30) Foreign Application Priority Data
Mar. 13, 2007  (JP) ............................. 2007-063569

(51) Int. Cl.
*B62D 3/12* (2006.01)

(52) U.S. Cl. ..................... 280/93.514; 74/422
(58) Field of Classification Search ............ 280/93.514, 280/93.513, 93.515; 74/10.39, 29, 89.11, 74/89.12, 120, 422
See application file for complete search history.

(56) References Cited

U.S. PATENT DOCUMENTS 4,709,591 A  * 12/1987  Emori et al. .................. 74/422
6,408,976 B1   6/2002  Saito et al.

FOREIGN PATENT DOCUMENTS

| DE | 101 08 284 A 1 | 10/2001 |
| JP | 2000-062628 | 2/2000 |
| JP | 2001-151140 | 6/2001 |
| JP | 2001-278075 | 10/2001 |

* cited by examiner

*Primary Examiner*—Eric Culbreth
(74) *Attorney, Agent, or Firm*—Rabin & Berdo, PC (57) ABSTRACT

A center take-off rack-and-pinion steering apparatus includes a cylindrical rack housing having an elongate hole extending in a longitudinal direction, a mounting bracket for mounting ends of a pair of tie rods on a rack shaft, and a slider interposed between the mounting bracket and the rack shaft and slidable in an inner periphery of the elongate hole. The inner periphery of the elongate hole and the slider include sliding contact sections that are brought into sliding contact with each other along with the slide of the slider slides. The sliding contact sections include at least a pair of curved sliding contact surfaces that are brought into sliding contact with each other in a curved shape when seen in an axial direction of the rack shaft.

5 Claims, 9 Drawing Sheets

CENTER TAKE-OFF RACK-AND-PINION STEERING APPARATUS

BACKGROUND OF THE INVENTION

1. Field of the Invention

The present invention relates to a center take-off rack-and-pinion steering apparatus.

2. Description of Related Art

Examples of a steering apparatus include a so-called center take-off steering apparatus. In this type of steering apparatus, a tie rod connected to a wheel is taken out of a rack shaft at a central position in a right-and-left direction of a vehicle body. For example, a steering mechanism includes a rack shaft and a longitudinal cylindrical rack housing receiving the rack shaft. An elongate hole is formed in an intermediate portion of the rack housing in a longitudinal direction. Through the elongate hole, the rack shaft and the tie rod are connected to each other through a slider. The rack housing and the slider are brought into sliding contact with each other (see Japanese Unexamined Patent Publication Nos. 2000-62628 and 2001-151140).

In Japanese Unexamined Patent Publication No. 2000-62628, the rack housing includes a flat first sliding contact surface formed in the inner periphery of the elongate hole and a flat second sliding contact surface formed at an edge surrounding the elongate hole on an outer peripheral surface of the rack housing.

Furthermore, the slider has flat first and flat second sliding contact surfaces that are individually brought into sliding contact with the first and second sliding contact surfaces of the rack housing. The first sliding contact surface of the rack housing extends parallel to the longitudinal direction and a depth direction of the elongate hole. The second sliding contact surface of the rack housing is perpendicular to the first sliding contact surface of the rack housing.

In Japanese Unexamined Patent Publication No. 2000-62628, the first and second sliding contact surfaces that are perpendicular to each other are provided, so that the manufacturing cost of the steering apparatus is high.

SUMMARY OF THE INVENTION

An object of the present invention is to provide a low-cost steering apparatus that can inhibit a rattle from occurring in a rack shaft.

According to a preferred aspect of the present invention, a center take-off rack-and-pinion steering apparatus is provided that includes a pinion rotating along with a steering member, a rack shaft that is meshed with the pinion and extends in an axial direction, and a cylindrical rack housing for supporting the rack shaft so as to be movable in the axial direction. The rack housing is formed with an elongate hole extending in a longitudinal direction parallel to the axial direction of the rack shaft. Furthermore, the center take-off rack-and-pinion steering apparatus includes a mounting bracket for mounting ends of a pair of tie rods for steering a pair of wheels on the rack shaft, and a slider interposed between the mounting bracket and the rack shaft and slidable in an inner periphery of the elongate hole. The inner periphery of the elongate hole and the slider include sliding contact sections that are brought into sliding contact with each other. The sliding contact sections include at least a pair of curved sliding contact surfaces that are brought into sliding contact with each other in a curved shape when seen in the axial direction of the rack shaft.

According to the present invention, the pair of curved sliding contact surfaces serving as sliding contact sections includes portions that are inclined to a width direction and a depth direction of the elongate hole which are perpendicular to the longitudinal direction of the elongate hole. Therefore, the movement of the slider can be regulated in the width direction and the depth direction of the elongate hole. As a result, a rattle hardly occurs in the rack shaft. Moreover, the rattle can be suppressed by a small number of curved sliding contact surfaces. Therefore, the configuration of the steering apparatus is simplified, and the manufacturing cost thereof is reduced.

BRIEF DESCRIPTION OF THE DRAWINGS

FIGS. 7A, 7B and 7C are schematic views of the slider and the elongate hole shown in FIG. 2, wherein FIG. 7A illustrates a state where the slider is incorporated into the elongate hole, FIG. 7B illustrates a state where the slider reaches one end of the elongate hole, and FIG. 7C illustrates a state where the slider reaches the other end of the elongate hole;

DETAILED DESCRIPTION OF THE PREFERRED EMBODIMENT

Figure 1:
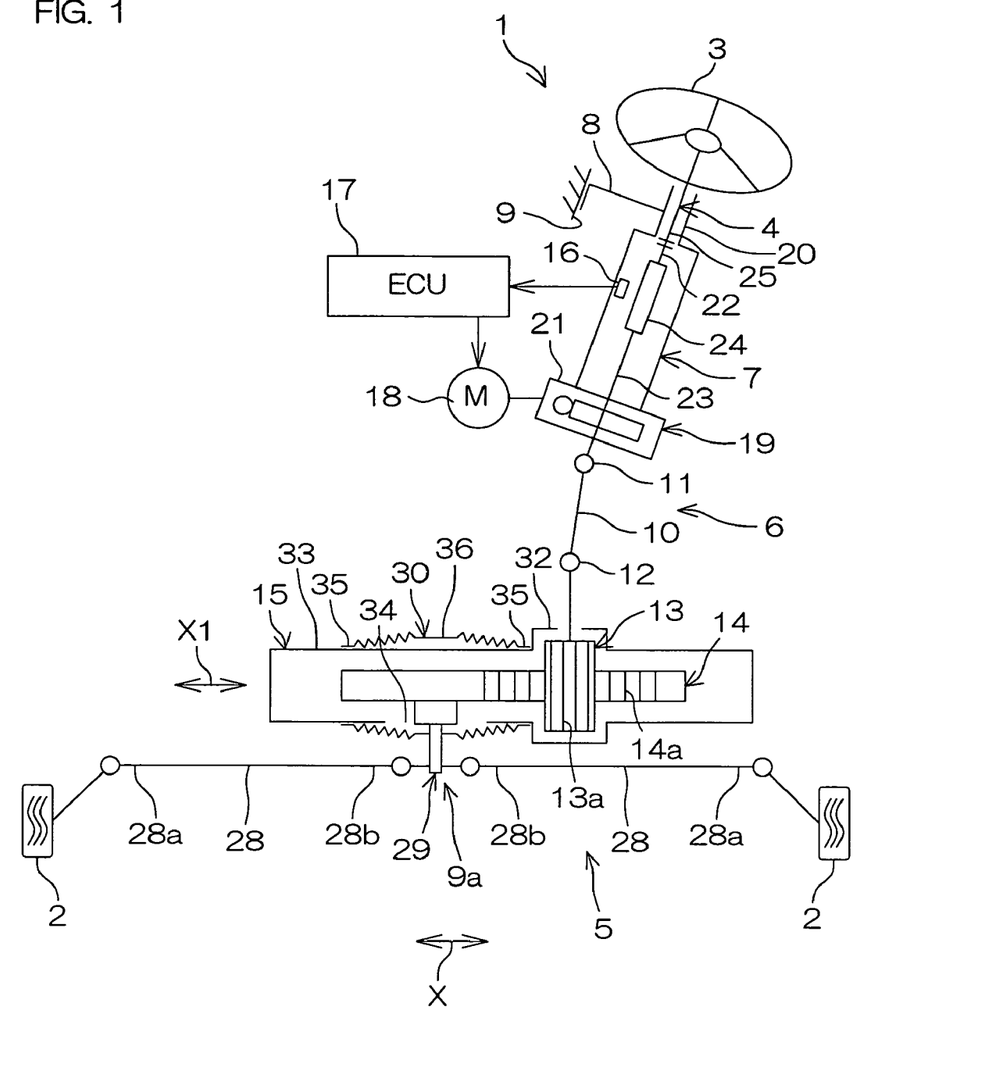
FIG. 1 is a schematic view showing the schematic configuration of a center take-off rack-and-pinion steering apparatus according to an embodiment of the present invention.

An embodiment of the present invention will be described in detail while referring to the attached drawings. Although in the present embodiment, description is made in conformity with a case where a center take-off rack-and-pinion steering apparatus is an electric power steering apparatus, the present invention is not limited to the same. For example, it may be a manually steered steering apparatus. FIG. 1 is a schematic view showing the schematic configuration of a center take-off rack-and-pinion steering apparatus according to an embodiment of the present invention.

Referring to FIG. 1, a center take-off rack-and-pinion steering apparatus 1 (merely referred to as a steering apparatus 1 hereinafter) includes a steering shaft 4 that transmits a steering torque applied to a steering wheel 3 serving as a steering member for steering wheels 2 and a steering mechanism 5 including a rack-and-pinion mechanism, for example, for steering the wheels 2 by the steering torque from the steering shaft 4. Furthermore, the steering apparatus 1 includes an intermediate shaft 6 provided between the steering shaft 4 and the steering mechanism 5 and serving as a shaft coupling for transmitting rotation therebetween.

The steering shaft 4 is inserted through a steering column 7 and is rotatably supported by the steering column 7. The steering column 7 is supported by a vehicle body 9 through a bracket 8. The steering wheel 3 is connected to one end of the steering shaft 4, and is rotatably supported thereon. The intermediate shaft 6 is connected to the other end of the steering shaft 4.

The intermediate shaft 6 includes a power transmission shaft 10, a universal joint 11 provided at one end of the intermediate shaft 6, and a universal joint 12 provided at the other end of the intermediate shaft 6.

The steering mechanism 5 includes a pinion 13 serving as an input shaft and a rack shaft 14 serving as a steering shaft extending in a right-and-left direction X of an automobile (direction perpendicular to the traveling direction of the automobile). The pinion 13 and the rack shaft 14 are supported by a housing 15. Pinion teeth 13a of the pinion 13 and rack teeth 14a of the rack shaft 14 are meshed with each other.

The pinion 13 is rotatably supported on a gear housing 32 constituting a portion of the housing 15. Furthermore, the rack shaft 14 is supported on a cylindrical rack housing 33 so as to be linearly and reciprocatingly movable. The rack housing 33 is fixed to the vehicle body 9. A rack shaft 14 is connected through a tie rod 28 described later and a knuckle arm (not shown) to the corresponding wheel 2.

When the steering wheel 3 is steered so that the steering shaft 4 is rotated, the rotation is converted into a linear motion of the rack shaft 14 along the right-and-left direction X of the automobile by the pinion teeth 13a and the rack teeth 14a. This allows steering of the wheel 2.

The steering apparatus 1 is adapted so as to obtain a steering assist force depending on the steering torque. That is, the steering apparatus 1 includes a torque sensor 16 that detects a steering torque, an ECU (Electronic Control Unit) 17 serving as a control section, an electric motor 18 for steering assist, and a reduction gear mechanism 19 serving as a gear device. In the present embodiment, the electric motor 18 and the reduction gear mechanism 19 are provided in association with the steering column 7.

The steering column 7 includes a column tube 20 and a housing 21. The housing 21 accommodates and supports the torque sensor 16. Furthermore, the housing 21 supports the electric motor 18.

The steering shaft 4 includes an input shaft 22, an output shaft 23, and a torsion bar 24 as its axial lower portions, and includes a connection shaft 25 as an axial upper portion. The input shaft 22 and the output shaft 23 are connected to each other on the same axis through the torsion bar 24. The input shaft 22 connects to the steering wheel 3 through the connection shaft 25. The output shaft 23 connects to the intermediate shaft 6. When the steering torque is inputted to the input shaft 22, the torsion bar 24 is subjected to elastic torsional deformation. This causes the input shaft 22 and the output shaft 23 to rotate relative to each other.

The torque sensor 16 detects a torque on the basis of the amount of relative rotational displacement between the input shaft 22 and the output shaft 23 through the torsion bar 24. The results of the torque detection by the torque sensor 16 are given to the ECU 17.

The ECU 17 controls the electric motor 18 on the basis of the above-mentioned results of the torque detection and the results of vehicle speed detection given by a vehicle speed sensor (not shown).

When the steering wheel 3 is operated, the steering torque is detected by the torque sensor 16, and the electric motor 18 produces a steering assist force depending on the results of the torque detection, the results of the vehicle speed detection, and the like. The steering assist force is transmitted to the steering mechanism 5 through the reduction gear mechanism 19. In addition thereto, the movement of the steering wheel 3 is also transmitted to the steering mechanism 5. As a result, the wheels 2 are steered, and the steering is assisted.

The steering apparatus 1 according to the present embodiment is configured as a center take-off steering apparatus. That is, the pair of tie rods 28 is taken out of a central position 9a in the right-and-left direction X of the vehicle body 9.

The steering mechanism 5 includes the pinion 13, the rack shaft 14, the housing 15, the pair of tie rods 28, which are described above, a connecting unit 29 that connects the pair of tie rods 28 and the rack shaft 15 to each other, and a dust cover 30.

Each of the tie rods 28 is a stick-shaped connecting material for connecting the rack shaft 14 and the corresponding wheel 2 to each other in order to steer the wheel 2 upon receipt of linear displacement of the rack shaft 14. An outer end 28a serving as an end outside of each of the tie rods 28 is connected to the corresponding wheel 2. An inner end 28b serving as an end inside of each of the tie rods 28 is arranged at a substantially central position of the vehicle body 9 in the right-and-left direction X of the vehicle body 9. The inner end 28b of each of the tie rods 28 is connected to an intermediate portion in an axial direction X1 of the rack shaft 14.

Figure 2:
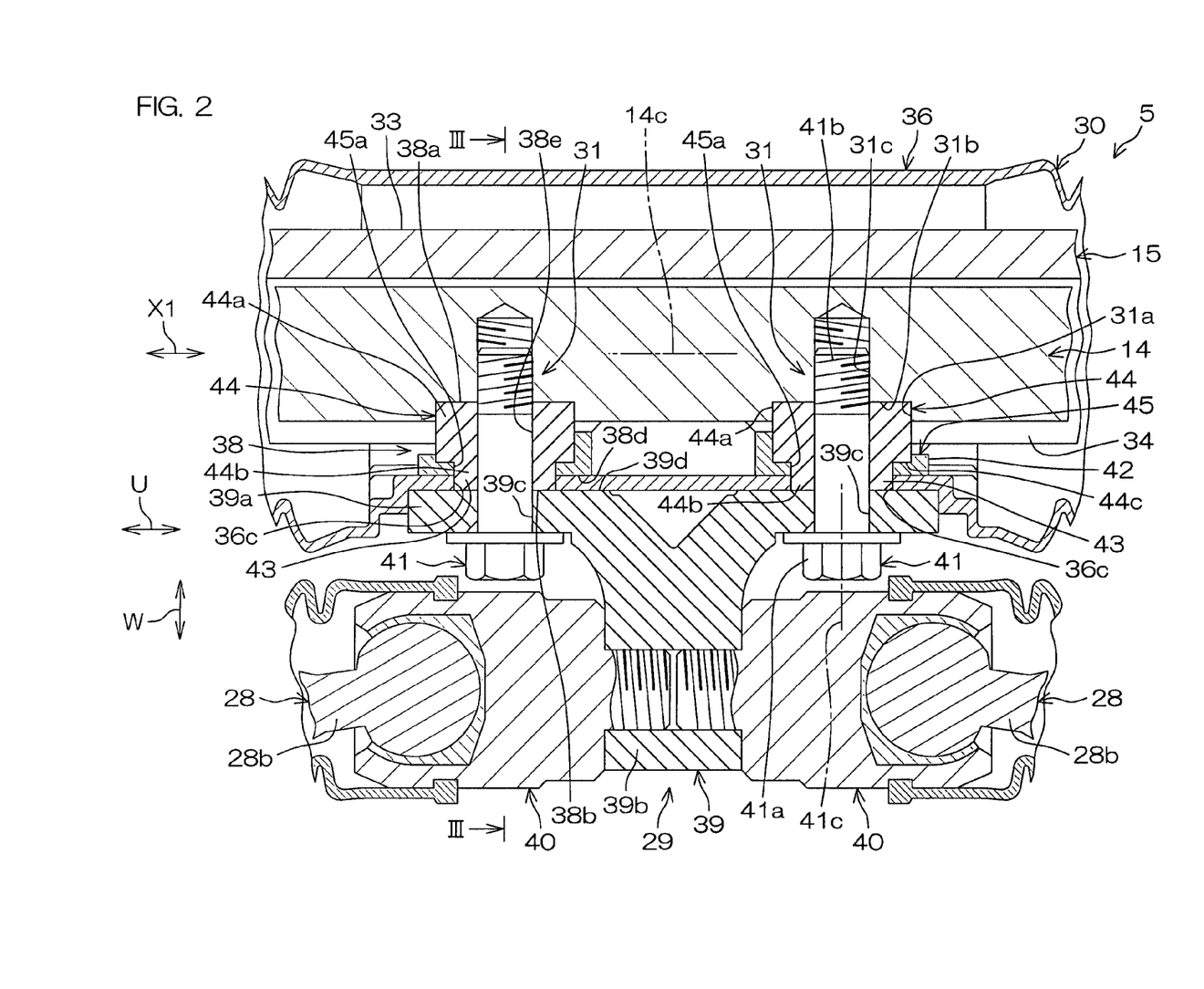
FIG. 2 is a partially sectional view of a principal part of a steering mechanism shown in FIG. 1.
Figure 3:
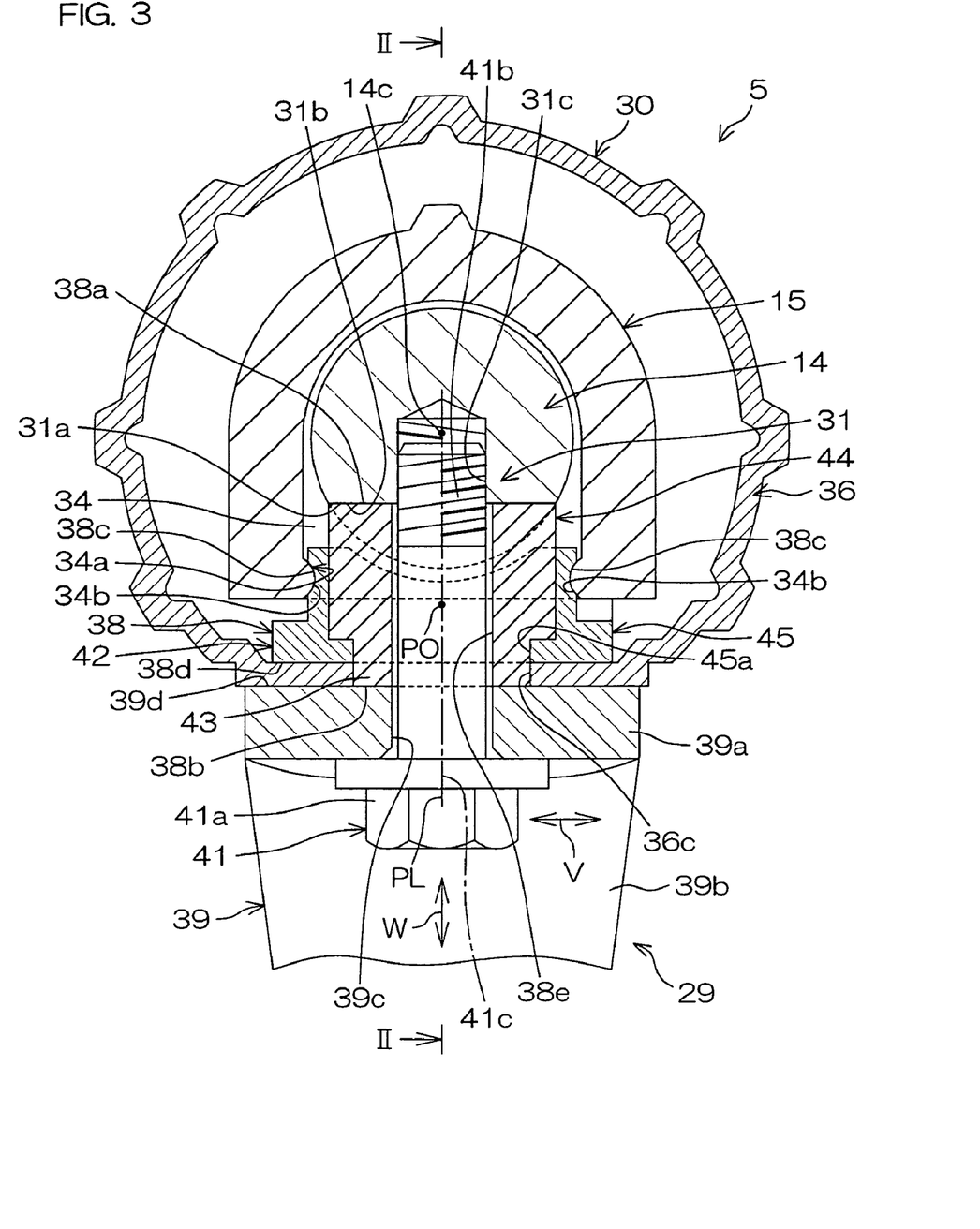
FIG. 3 is a cross sectional view taken along a line III-III of FIG. 2.
Figure 4:
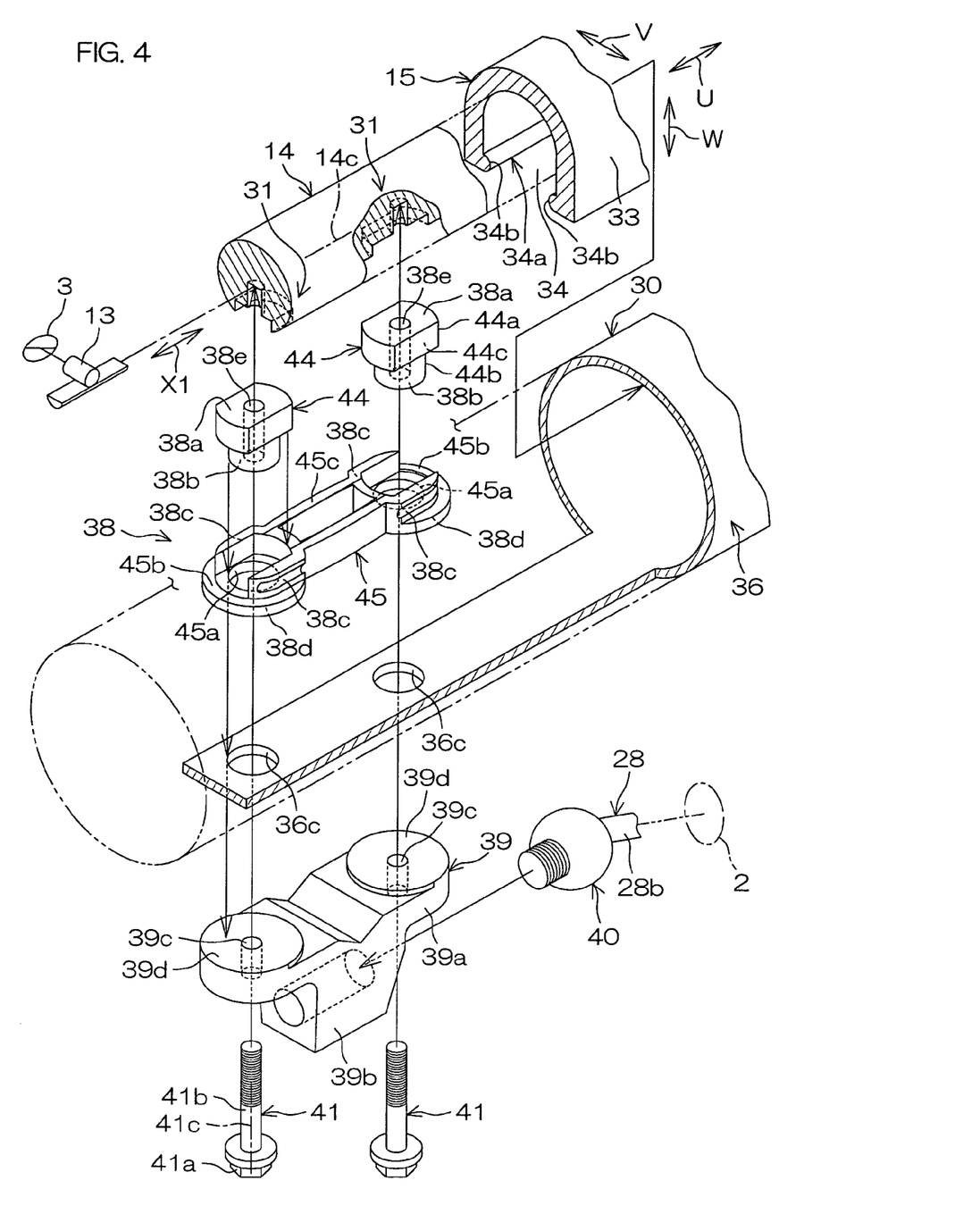
FIG. 4 is an exploded perspective view of a principal part of the steering mechanism shown in FIG. 1, also schematically showing a peripheral part thereof.

FIG. 2 is a partially sectional view of a principal part of the steering mechanism 5 shown in FIG. 1, showing a cross section taken along a line II-II of FIG. 3. FIG. 3 is a partially sectional view of a cross section taken along a line III-III of FIG. 2. FIG. 4 is an exploded perspective view of the principal part of the steering mechanism 5, also schematically showing a peripheral part thereof.

Referring to FIGS. 2 and 4, the rack shaft 14 includes a pair of mounting sections 31 for mounting the connecting unit 29 in an intermediate portion in the axial direction X1. Each of the mounting sections 31 includes a recess 31a that receives a spacer 44 in a slider 38, described later, in the connecting unit 29 in a positioned state and a screw hole 31c formed at the bottom 31b of the recess 31a. A fixing screw 41, described later, in the connecting unit 29 is screwed into the screw hole 31c.

Referring to FIGS. 1 and 3, the housing 15 supports the rack shaft 14 so as to be slidable along the axial direction X1 of the rack shaft 14. The housing 15 includes the gear housing 32 accommodating the pinion 13 and the longitudinal rack housing 33 in the shape of a long cylinder consecutively connected to the gear housing 32. A longitudinal direction of the rack housing 33 is arranged parallel to the axial direction X1 of the rack shaft 14. One end of the rack housing 33 is fixed to the gear housing 32. The rack housing 33 accommodates and supports the rack shaft 14. An elongate hole 34 is formed in an intermediate portion in the longitudinal direction of the rack housing 33.

A portion of the connecting unit 29 is passed through the elongate hole 34. With the displacement of the rack shaft 14 in the axial direction X1, the elongate hole 34 having a length corresponding to a movement range of the connecting unit 29 is formed such that the connecting unit 29 is movable.

Figure 5:
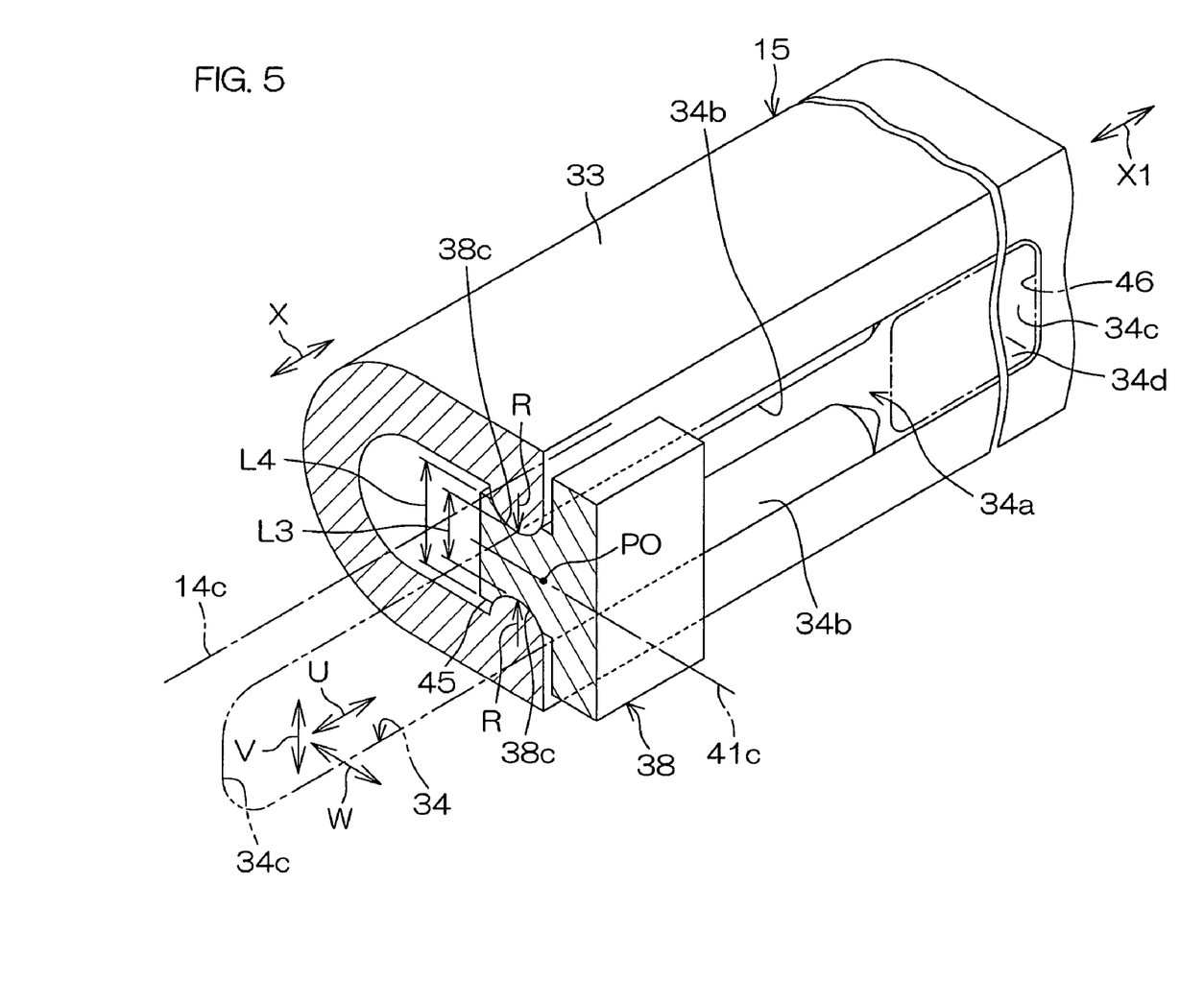
FIG. 5 is a schematic partially broken perspective view of a slider and an elongate hole shown in FIG. 2.
Figure 6:
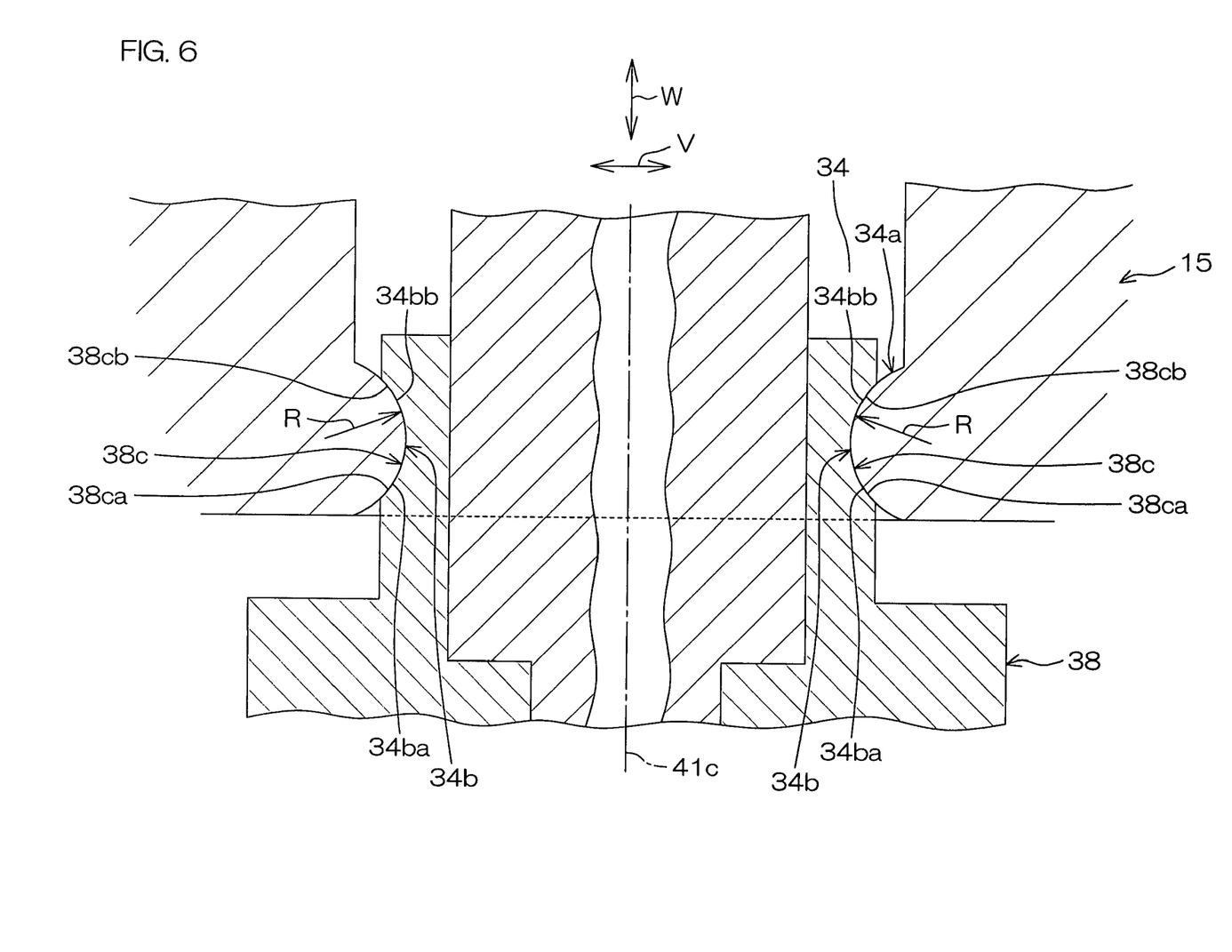
FIG. 6 is an enlarged view of the principal part shown in FIG. 3.

FIG. 5 is a schematic partially broken perspective view of the elongate hole 34 and the slider 38. FIG. 6 is an enlarged view of the principal part shown in FIG. 3.

Referring to FIGS. 3 and 5, the elongate hole 34 extends long in parallel to the longitudinal direction of the rack housing 33, and penetrates the inner periphery and the outer periphery of the rack housing 33 in a radial direction of the rack housing 33. The radial direction corresponds to a depth direction W of the elongate hole 34, and is a direction passing through a central position PO of the elongate hole 34 to a circumferential direction of the rack shaft 14.

The elongate hole 34 is formed to be longer in the longitudinal direction U, and shorter in a short-side direction V. The longitudinal direction U is a direction parallel to the longitudinal direction of the rack housing 33. The short-side direction V corresponds to a width direction of the elongate hole 34, and is a direction perpendicular to the longitudinal direction U and the depth direction W of the elongate hole 34. The short-side direction V is also referred to as a width direction V hereinafter.

The inner periphery 34a of the elongate hole 34 includes a pair of curved sliding contact surfaces 34b that are brought into contact with a curved sliding contact surface 38c serving as a sliding contact section of the slider 38 described later, and a pair of non-contact sections 34c that are not brought into contact with the slider 38. The pair of non-contact sections 34c is formed at both ends of the elongate hole 34 in the longitudinal direction U.

The pair of curved sliding contact surfaces 34b is formed at a pair of edges opposed to each other in the short-side direction V of the elongate hole 34 in the inner periphery 34a of the elongate hole 34. The pair of curved sliding contact surfaces 34b extends in parallel to the longitudinal direction U of the elongate hole 34. Each of the curved sliding contact surfaces 34b is formed like a drain pipe having a convex-curved surface serving as a curved surface. The convex-curved surface extends along the longitudinal direction U of the elongate hole 34. The convex-curved surface forms a circular arc shape in cross section having a radius R of curvature in a cross section perpendicular to the longitudinal direction U of the elongate hole 34. The shape in cross section is made constant irrespective of the position thereof in the longitudinal direction U. That is, the convex-curved surface includes a portion of a cylindrical surface.

The respective shapes in cross section of the pair of curbed sliding contact surfaces 34b, e.g., the radii R of curvature have equal values. Furthermore, a pair of sliding contact sections 34b is arranged in a linearly symmetrical relationship with respect to a central axis 41c of the fixing screw 41, as viewed along the axial direction X1 of the rack shaft 14.

Referring to FIGS. 3 and 6, each of the curved sliding contact surfaces 34b has a first section 34ba and a second section 34bb. The first section 34ba is arranged farther from the rack shaft 14 in the depth direction W of the elongate hole 34, and faces the outside of the rack housing 33. The first sections 34ba of the pair of curved sliding contact surfaces 34b are opposed to each other while being directed toward the outside of the rack housing 33, and are inclined to the depth direction W of the elongate hole 34. The first section 34ba constitutes a chamfer formed in an inlet to the inner periphery 34a of the elongate hole 34.

The second section 34bb is arranged closer to the rack shaft 14 to the depth direction W of the elongate hole 34, and faces the inside of the rack housing 33. The second sections 34bb of the pair of curved sliding contact surfaces 34b are opposed to each other while being directed toward the inside of the rack housing 33, and are inclined to the depth direction W of the elongate hole 34.

Referring to FIGS. 1 and 3, the dust cover 30 forms the shape of a cylinder extending in one direction, and is formed of a rubber member or a synthetic resin member serving as an elastic member so as to be extendable in a direction in which the dust cover 30 extends (longitudinal direction). The longitudinal direction of the dust cover 30 is arranged in parallel to the longitudinal direction of the rack housing 33. The dust cover 30 covers the elongate hole 34 of the rack housing 33.

Both ends 35 of the dust cover 30 in the longitudinal direction of the dust cover 30 are fixed to the cylinder of the rack housing 33. The center 36 of the dust cover 30 in the longitudinal direction of the dust cover 30 is adapted to move along with the connecting unit 29, and has a hole 36c penetrating the inside to the outside of the dust cover 30. The hole 36c is provided so as to connect the tie rod 28 and the rack shaft 14 to each other, and is passed by the spacer 44 and the fixing screw 41 in the slider 38 described later in the connecting unit 29.

Referring to FIGS. 2 and 4, the connecting unit 29 includes a slider 38 that slides in the inner periphery 34a of the elongate hole 34 of the rack housing 33 while moving integrally with the rack shaft 14 and a mounting bracket 39 for mounting the pair of tie rods 28 on the slider 38. Furthermore, the connecting unit 29 includes a pair of spherical bearings 40 serving as couplings that individually and swingingly connect the mounting bracket 39 and the tie rods 28 to each other and a plurality of, e.g., two fixing screws 41 serving as fixtures that fix the mounting bracket 39 and the slider 38 to the rack shaft 14.

The inner end 28b of the tie rod 28 is connected to the rack shaft 14 through the spherical bearing 40, the mounting bracket 39, and the slider 38. The number of fixing screws 41 may be plural or single, that is, the number of fixing screws 41 may be at least one. In the present embodiment, description is made in conformity with a case where the number of fixing screws 41 is two.

The spherical bearing 40 includes a ball and a receptacle forming the shape of a recess receiving the ball. The ball forms a partially spherical surface, and is fixed to the inner end 28b of the corresponding tie rod 28. Furthermore, the receptacle forms a partially spherical surface. The center of the partially spherical surface of the ball (which coincides with the center of the partially spherical surface of the receptacle) is the center of the spherical bearing 40. Around the center of the spherical bearing 40, the corresponding tie rod 28 is adapted to be swingable. Furthermore, the receptacle has a mounting screw for mounting on the mounting bracket 39 provided so as to project as its support shaft. The mounting screw and the receptacle are separately formed, and are fixed to each other. A male screw is formed in the mounting screw.

The mounting bracket 39 is provided to mount the inner end 28b of each of the tie rods 28 to the rack shaft 14. The mounting bracket 39 includes a base 39a opposed to the slider 38 and a supporting section 39b serving as an arm projecting from the base 39a. The base 39a and the supporting section 39b form a T shape and are integrally formed of a single member.

The base 39a includes a pair of screw insertion holes 39c penetrating the base 39a. The fixing screw 41 is inserted through the screw insertion hole 39c. Furthermore, the base 39a includes an opposed section 39d opposed to the dust cover 30. At least a portion of the opposed section 39d is abutted against the dust cover 30.

The supporting section 39b extends from the base 39a at a central position of the base 39a in the axial direction X1. That is, the supporting section 39b rises from the base 39a, and extends in a direction perpendicularly crossing the axial direction X1 and away from the rack shaft 14 in the depth direction W of the elongate hole 34. The supporting section 39b is connected to the pair of spherical bearings 40, and supports the inner ends 28b of the pair of tie rods 28 through the pair of spherical bearings 40. Specifically, the supporting section 39b has a screw hole penetrating the supporting section 39b in a direction parallel to the axial direction X1.

Mounting screws in the pair of spherical bearings 40 are screwed into the screw hole on both sides.

The fixing screw 41 is fixed to the rack shaft 14 after penetrating the mounting bracket 39 and the slider 38. Specifically, the fixing screw 41 is a bolt, and includes a head 41a and a shaft 41b formed with a male screw.

Although the central axis 41c of the fixing screw 41 is parallel to the depth direction W of the elongate hole 34, and perpendicularly crosses the central axis 14c of the rack shaft 14 in the present embodiment, the central axis 41c may be arranged to offset in the width direction V of the elongate hole 34.

The male screw of the shaft 41b in the fixing screw 41 is screwed into the screw hole 31c of the mounting section 31 in the rack shaft 14. The mounting bracket 39 and the slider 38 are clamped between the head 41a of the fixing screw 41 and the bottom 31b of the recess 31a in the mounting section 31 in the rack shaft 14.

The slider 38 is fixed to the mounting section 31 in the rack shaft 14 so as to be movable integrally with the rack shaft 14. The slider 38 is interposed between the mounting bracket 39 and the rack shaft 14, and connects both the mounting bracket 39 and the rack shaft 14 to each other. The slider 38 holds the center 36 of the dust cover 30 so as to be integrally movable.

Referring to FIGS. 3 and 4, the slider 38 includes a first connecting section 38a connected to the rack shaft 14 in a fixed state, a second connecting section 38b connected to the mounting bracket 39 in a fixed state, and a curved sliding contact surface 38c slidably fitted in the inner periphery 34a of the elongate hole 34 of the rack housing 33. Furthermore, the slider 38 includes a holding section 38d opposed to the mounting bracket 39 for holding the dust cover 30 in a clamped state and an insertion hole 38e through which the fixing screw 41 is inserted. Although the sections 38a, 38b, 38c, 38d or 38e, each are provided in plural, at least one of each may be sufficient.

Referring to FIGS. 2 and 3, the slider 38 includes a main body 42 and two projections 43. The two projections 43 are formed similarly to each other.

The main body 42 is arranged closer to the rack shaft 14 than the holding section 38d. The main body 42 includes the first connecting section 38a, the curved sliding contact surface 38c, and the holding section 38d, described above. Each of the projections 43 is constituted by a portion closer to a front end than the holding section 38d in the slider 38, and projects from the main body 42 in a direction perpendicularly crossing the axial direction X1 of the rack shaft 14. Each of the projections 43 includes the second connecting section 38b. Furthermore, the insertion hole 38e penetrates the main body 42 and the corresponding projection 43.

Specifically, the slider 38 includes a pair of cylindrical spacers 44 respectively corresponding to the tie rods 28 and a connector 45 that connects the spacers 44 to each other. The pair of spacers 44 and the connector 45 are separately formed, and are combined with each other to constitute the slider 38.

Referring to FIGS. 2 and 4, the spacer 44 connects the rack shaft 14 inside of the rack housing 33 and the base 39a in the mounting bracket 39 outside of the rack housing 33 so as to be movable integrally with each other in a state of being spaced apart from each other. The spacer 44 includes a first section 44a having a relatively large diameter arranged closer to the rack shaft 14 and a second section 44b having a relatively small diameter arranged closer to the mounting bracket 39 than the first section 44a. The first section 44a and the second section 44b are integrally formed. The insertion hole 38e penetrates the first and second sections 44a and 44b.

The first section 44a includes the first connecting section 38a. The first section 44a positions the rack shaft 14 and the connector 45 in a direction adjacent to each other. Furthermore, the first section 44a regulates relative rotation between the rack shaft 14 and the connector 45 around the axis 41c of the fixing screw 41. The second section 44b includes the second connecting section 38b. An outer peripheral surface of the second section 44b is formed into a cylindrical surface. The outer peripheral surface of the second section 44b is connected to an outer peripheral surface of the first section 44a through an end surface 44c of the first section 44a.

The connector 45 is formed of a synthetic resin member having a low sliding resistance. The connector 45 includes a pair of annular sections 45b for individually holding a pair of spacers 44 and a connecting section 45c for connecting a pair of annular sections 45b to each other. Each of the annular sections 45b is received by the end surface 44c of the spacer 44. Each of the annular sections 45b has an insertion hole 45a. A front end of the second section 44b in the spacer 44 serving as the corresponding projection 43 is inserted through each of the insertion holes 45a. The connector 45 includes the curved sliding contact surface 38c and the holding section 38d.

Referring to FIGS. 3 and 4, the curved sliding contact surface 38c is provided on a pair of side surfaces of the pair of annular sections 45b in the connector 45. Four curved sliding contact surfaces 38c are formed as the entire slider 38. The two curved sliding contact surfaces 38c provided in one of the annular sections 45b and the two curved sliding contact surfaces 38c provided in the other annular section 45b are formed similarly to each other, and are spaced apart from each other at a predetermined distance in the longitudinal direction U of the elongate hole 34. Description is made about the one annular section 45b.

Referring to FIGS. 3 and 5, each of the curved sliding contact surfaces 38c is arranged so as to be opposed to the curved sliding contact surface 34b in the inner periphery 34a of the elongate hole 34. Each of the curved sliding contact surfaces 38c is formed like a drain pipe having a concave-curved surface serving as a curved surface opposite to the opposed curved sliding contact surface 34b and in an opposite direction thereto. The concave-curved surface includes a portion of a cylindrical surface. Each of the curved sliding contact surfaces 38c extends in parallel to the longitudinal direction U of the elongate hole 34 and forms a circular arc shape in cross section having a radius R of curvature, similarly to the curved sliding contact surface 34b in the inner periphery 34a of the elongate hole 34. The radius of curvature of the circular arc shape in cross section of the curved sliding contact surface 38c may be a value equal to the radius of curvature of a circular arc shape in cross section of the curved sliding contact surface 34b, or may be an approximate value within a predetermined range that approximates the equal value (0% to 10% of the equal value).

Referring to FIGS. 3 and 6, each of the curved sliding contact surfaces 38c includes a first section 38ca that is brought into sliding contact with the first section 34ba (corresponding to a chamfer) in the corresponding curved sliding contact surface 34b and a second section 38cb that is brought into sliding contact with the second section 34bb in the corresponding curved sliding contact surface 34b.

Each of the curved sliding contact surfaces 38c in the slider 38 and the curved sliding contact surface 34b in the inner periphery 34a of the elongate hole 34 are opposed to each other, and are in contact with each other in a surface contact state so as to be movable relative to each other in the longitudinal direction U of the elongate hole 34. Both the curved sliding contact surfaces 38c and 34b are brought into sliding contact with each other along with the slide of the slider 38. The rack housing 33 and the slider 38 are adapted not to contact with each other in a portion other than the corresponding curved sliding contact surfaces 34b and 38c.

Referring to FIGS. 1 and 3, when an external force from the wheel 2 is exerted bilaterally on the depth direction W of the elongate hole 34 through the tie rods 28 and the mounting bracket 39, for example, the curved sliding contact surface 38c in the slider 38 and the curved sliding contact surface 34b in the elongate hole 34 are abutted against each other. Thus, the above-mentioned external force is received to prevent the rack shaft 14 from bilateral moving in the depth direction W of the elongate hole 34. Therefore, a rattle can be inhibited from occurring in the rack shaft 14. Furthermore, when the external force is exerted bilaterally on the width direction V of the elongate hole 34, a rattle is also inhibited from occurring in the rack shaft 14 in the same manner.

Figure 7A:
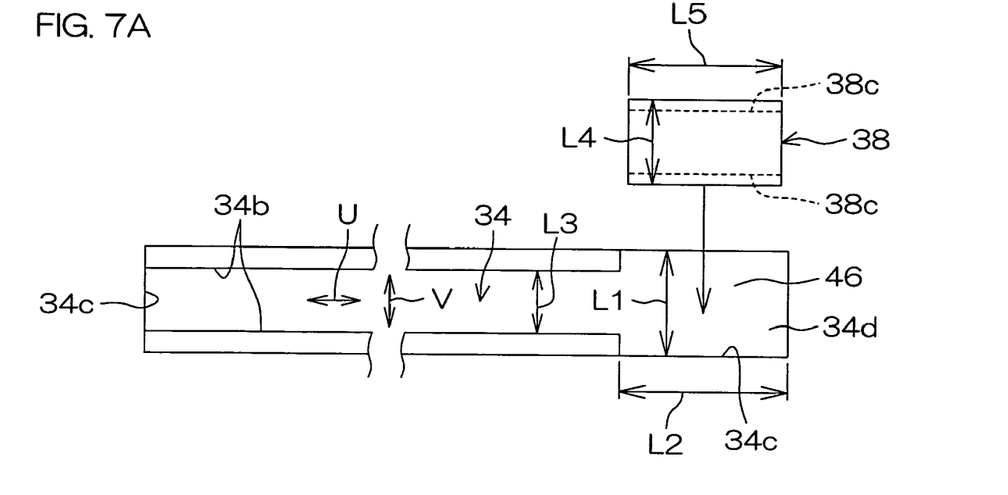
Figure 7B:
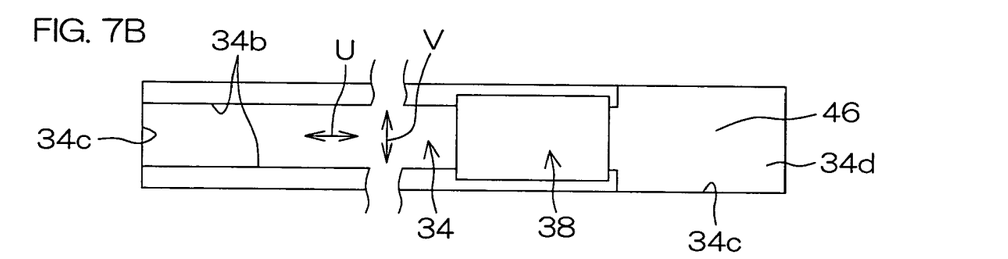
Figure 7C:
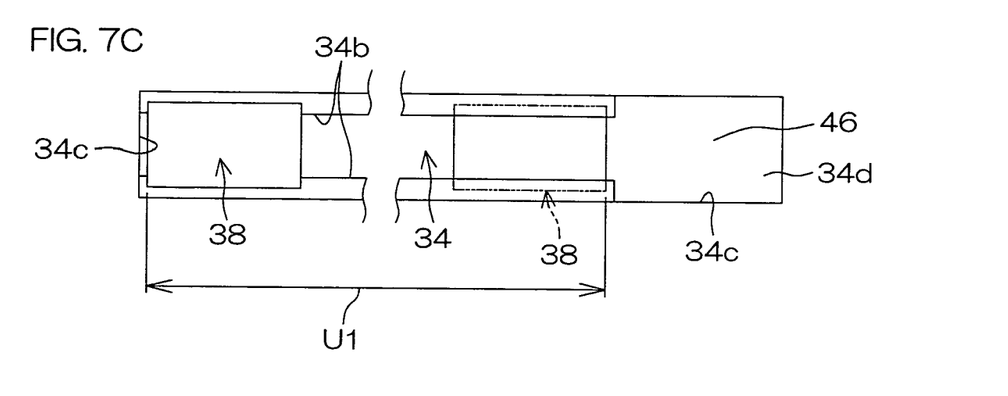

FIGS. 7A to 7C are schematic views of the slider 38 and the elongate hole 34 shown in FIG. 2. FIG. 7A illustrates a state where the slider 38 is incorporated into the elongate hole 34, FIG. 7B illustrates a state where the slider 38 reaches one end in its movement range, and FIG. 7C illustrates a state where the slider 38 reaches the other end in the movement range. The slider 38 at a position shown in FIG. 7B is also indicated by a two-dot and dash line in FIG. 7c.

Referring to FIGS. 5 and 7A, the elongate hole 34 has an opening 46 for incorporating the slider 38 into the rack housing 33.

The opening 46 constitutes the above-mentioned non-contact section 34c, and no curved sliding contact surface 34b is provided on both sides of the opening 46 to the width direction V. The opening 46 has a size that can pass the slider 38. That is, the dimension L1 of the opening 46 to the width direction V of the elongate hole 34 is made larger than the minimum distance L3 between the curved sliding contact surfaces 34b in the elongate hole 34 (L1>L3), and is made larger than the maximum dimension L4 of the curved sliding contact surface 38c in the slider 38 (L1>L4).

The dimension L2 of the opening 46 to the longitudinal direction U of the elongate hole 34 is made larger than the maximum dimension L5 of the connector 45 serving as a portion of the slider 38, and arranged within the elongate hole 34 (L2>L5).

Referring to FIGS. 1, 7B and 7C, the opening 46 is arranged at the one end 34d of the elongate hole 34 to the longitudinal direction U of the elongate hole 34. Furthermore, the opening 46 is arranged outside a region U1 where the slider 38 is movable at the normal time in the elongate hole 34. The region U1 is a region occupied by the slider 38 while moving when the steering wheel 3 is rotated from one end to the other end of the rotational movement range thereof. The opening 46 is covered with the dust cover 30.

Referring to FIG. 7A, even when the minimum distance L3 between the curved sliding contact surfaces 34b in the elongate hole 34 is smaller than the maximum dimension L4 of the curved sliding contact surfaces 38c in the slider 38 (L3<L4) to the width direction V of the elongate hole 34, the curved sliding contact surface 38c in the slider 38 can be easily assembled into the curved sliding contact surface 34b in the elongate hole 34 through the opening 46.

Referring to FIGS. 1 and 4, the steering apparatus 1 according to the present embodiment is a center take-off steering apparatus so adapted that the rotation of the pinion 13 that rotates along with the steering wheel 3 serving a steering member is converted into linear displacement of the rack shaft 14 extending in the right-and-left direction X of the vehicle body 9, and the pair of tie rods 28 for steering the pair of wheels 2 is taken out of the central position 9a in the right-and-left direction X of the vehicle body 9 upon receipt of the linear displacement. The steering apparatus 1 includes the cylindrical rack housing 33 that supports the rack shaft 14 so as to be slidable in the axial direction X1 and has the elongate hole 34 extending in the longitudinal direction U, the mounting bracket 39 for mounting the inner end 28b of each of the tie rods 28 on the rack shaft 14, and the slider 38 that is interposed between the mounting bracket 39 and the rack shaft 14 and slides on the inner periphery 34a of the elongate hole 34. The inner periphery 34a of the elongate hole 34 and the slider 38 have curved sliding contact surfaces 34b and 38c respectively that are brought into sliding contact with each other along with the slide of the slider 38, and the curved sliding contact surfaces 34b and 38c each form curved shapes as viewed from the axial direction X1 of the rack shaft 14.

According to the present embodiment, the curved sliding contact surface 34b in a curved shape of the rack housing 33 includes a portion inclined to the width direction V and the depth direction W of the elongate hole 34 perpendicular to the longitudinal direction U of the elongate hole 34, so that the movement of the slider 38 to the width direction V and the depth direction W of the elongate hole 34 can be regulated. As a result, a rattle does not easily occur in the rack shaft 14. Moreover, the rattle can be suppressed with a small number of curved surfaces. Therefore, the configuration of the steering apparatus 1 is simplified, and the manufacturing cost thereof is reduced.

Furthermore, the curved sliding contact surface 34b includes the first section 34ba (corresponding to the chamfer) directed toward the outside of the rack housing 33 and the second section 34bb directed toward the inside of the rack housing 33. The curved sliding contact surface 38c includes the first and second sections 38ca and 38cb so as to be brought into sliding contact with the sections 34ba and 34bb respectively. This allows regulation of the bilateral movement of the slider 38 to the depth direction W of the elongate hole 34, so that a rattle hardly occurs further in the rack shaft 14.

The curved sliding contact surface 38c in the slider 38 and the curved sliding contact surface 34b in the elongate hole 34 that slide-contact with each other are provided in opposite directions on both sides individually in the width direction V of the elongate hole 34. Thus, the external force can be reliably received on both sides of the width direction V.

Furthermore, the following modified example can be considered with respect to the present embodiment. In the following description, the points different from those in the above-mentioned embodiment will be mainly described. The same constituent elements are assigned the same reference numerals and hence, the description thereof is omitted.

Figure 8:
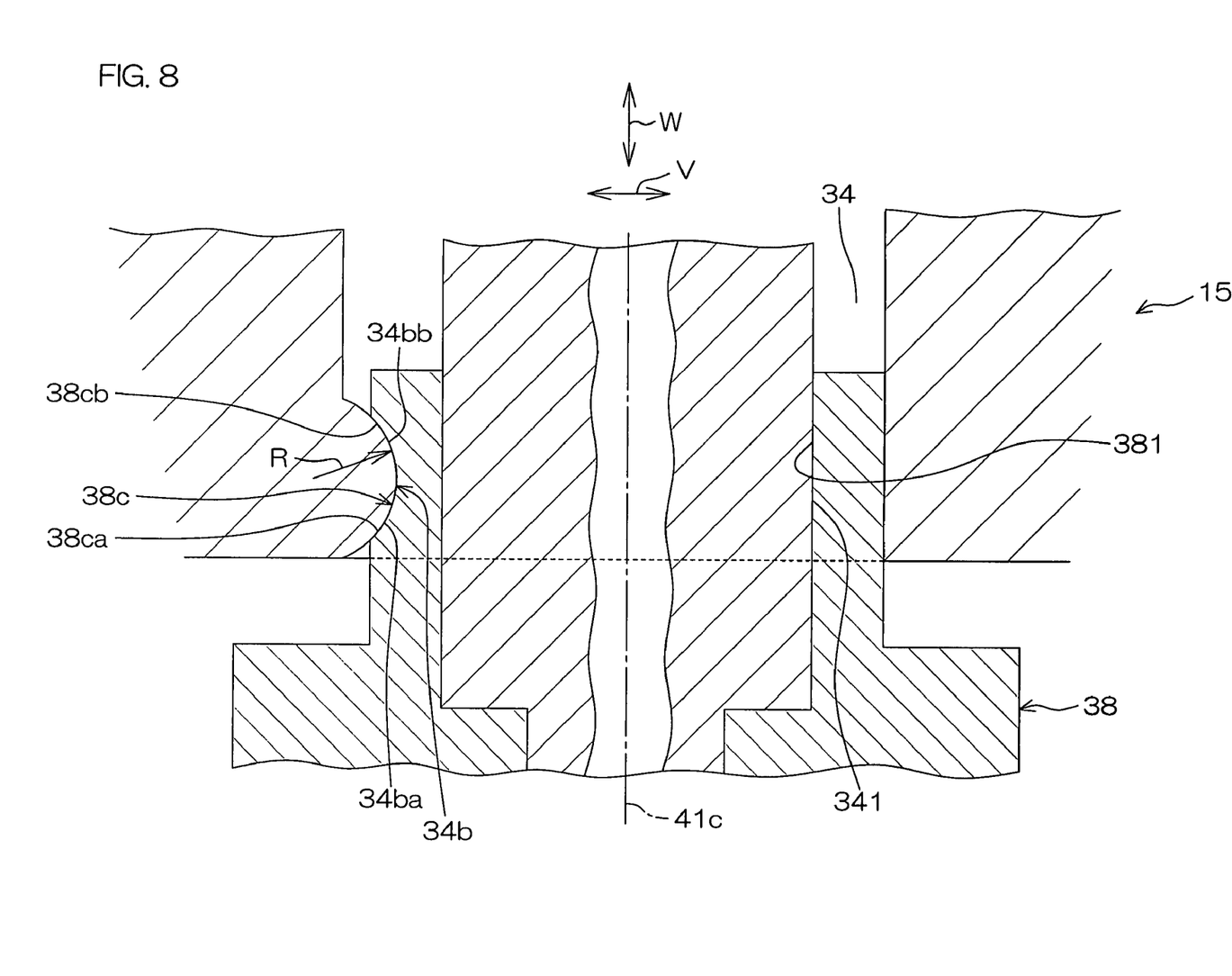
FIG. 8 is a cross sectional view of a principal part of a steering mechanism according to another embodiment of the present invention.

For example, as shown in FIG. 8, the curved sliding contact surfaces 34b and 38c may be provided on one side of the width direction V of the elongate hole 34, and flat sliding contact surfaces 341 and 381 may be brought into sliding contact with each other on the other side thereof.

Figure 9:
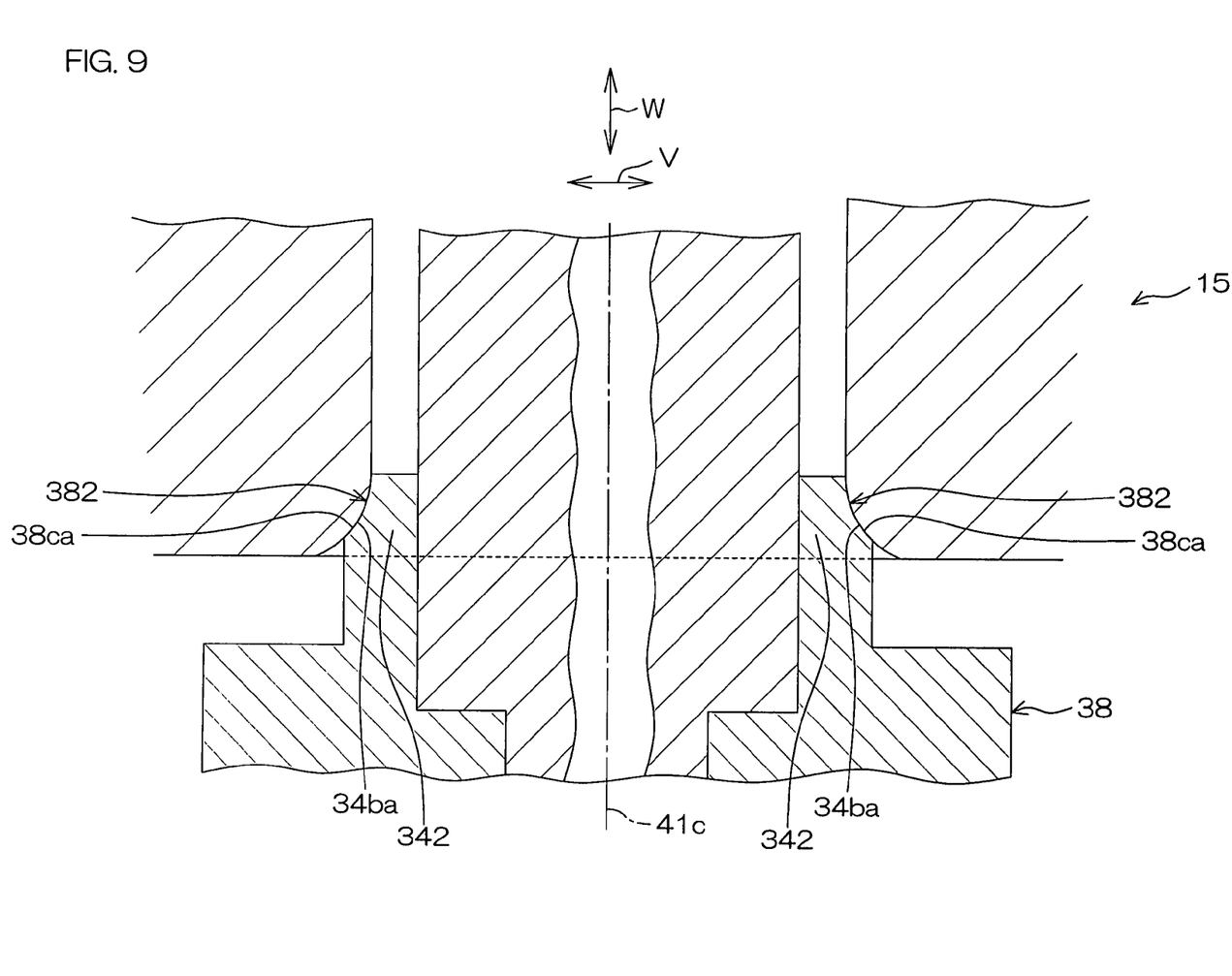
FIG. 9 is a cross sectional view of a principal part of a steering mechanism according to still another embodiment of the present invention.

Furthermore, as shown in FIG. 9, the second sections 34bb and 38cb may be removed, and only the first sections 34ba and 38ca serving as chamfers may constitute the curved sliding contact surfaces 34b and 38c respectively.

A curved sliding contact surface made of a concave-curved surface may be provided in the inner periphery 34a of the elongate hole 34, and a curved sliding contact surface made of a convex-curved surface may be provided on a side surface of the slider 38, though not illustrated.

In order to easily assemble the slider 38, the rack housing 33 may be divided into a plurality of components, if appropriate. For example, the rack housing 33 may be divided at an intermediate portion to its longitudinal direction, and the elongate hole 34 may be openable in the longitudinal direction U.

Although the above-mentioned steering apparatus 1 uses an electric motor as a driving source to obtain a steering assist force, a hydraulic power cylinder serving as a hydraulic actuator may be utilized. Furthermore, a driving source to obtain a steering assist force may be provided in the rack housing 33 in addition to the steering column 7.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The present application corresponds and claims the benefit of priority from Japanese Patent Application No. 2007-63569, filed with the Japan Patent Office on Mar. 13, 2007, the content of which is incorporated herein by reference in its entirety.

What is claimed is:

1. A center take-off rack-and-pinion steering apparatus, comprising:
    a pinion rotating along with a steering member;
    a rack shaft meshed with the pinion and extending in an axial direction;
    a cylindrical rack housing for supporting the rack shaft so as to be movable in the axial direction, the rack housing formed with an elongate hole extending in a longitudinal direction parallel to the axial direction of the rack shaft;
    a mounting bracket for mounting ends of a pair of tie rods for steering a pair of wheels on the rack shaft; and
    a slider interposed between the mounting bracket and the rack shaft and slidable in an inner periphery of the elongate hole,
    wherein the inner periphery of the elongate hole and the slider include sliding contact sections that are brought into sliding contact with each other, and
    the sliding contact sections include at least a pair of curved sliding contact surfaces that are brought into sliding contact with each other in a curved shape when seen in the axial direction of the rack shaft.

2. The center take-off rack-and-pinion steering apparatus according to claim 1, wherein
    at least the pair of curved sliding contact surfaces includes a convex-curved surface and a concave-curved surface that contact with each other.

3. The center take-off rack-and-pinion steering apparatus according to claim 2, wherein
    the convex-curved surface and the concave-curved surface include a part of a cylindrical surface.

4. The center take-off rack-and-pinion steering apparatus according to claim 1, wherein
    the curved sliding contact surface serving as a sliding contact section provided in the inner periphery of the elongate hole includes a curved chamfer formed in an inlet to the elongate hole.

5. The center take-off rack-and-pinion steering apparatus according to claim 4, wherein
    the inner periphery of the elongate hole is brought into sliding contact with the slider only on the chamfer.

* * * * *